United States Patent

Iskiyan et al.

[15] 3,699,526

[45] Oct. 17, 1972

[54] PROGRAM SELECTION BASED UPON INTRINSIC CHARACTERISTICS OF AN INSTRUCTION STREAM

[72] Inventors: James L. Iskiyan; James M. Waddell, both of Boulder; Donald L. Way, Loveland, all of Colo.

[73] Assignee: International Business Machines Corporation, Armonk, N.Y.

[22] Filed: March 26, 1971

[21] Appl. No.: 128,424

[52] U.S. Cl. ......................................... 340/172.5

[51] Int. Cl. ......................................... G06f 9/00

[58] Field of Search ......................................... 340/172.5

[56] References Cited

UNITED STATES PATENTS

| | | | |
|---|---|---|---|
| 3,153,775 | 10/1964 | Marsh | 340/172.5 |
| 3,470,540 | 9/1969 | Levy | 340/172.5 |
| 3,513,446 | 5/1970 | Cotton et al. | 340/172.5 |
| 3,516,070 | 6/1970 | Campano et al. | 340/172.5 |
| 3,535,697 | 10/1970 | Melliar-Smith | 340/172.5 |
| 3,454,932 | 7/1969 | Bahrs et al. | 340/172.5 |
| 3,577,190 | 5/1971 | Cocke et al. | 340/172.5 |
| 3,408,630 | 10/1968 | Packard et al. | 340/172.5 |
| 3,454,933 | 7/1969 | Bahrs et al. | 340/172.5 |
| 3,577,189 | 5/1971 | Cocke et al. | 340/172.5 |
| 2,978,175 | 4/1961 | Newman et al. | 340/172.5 |
| 3,340,513 | 9/1967 | Kinzie et al. | 340/172.5 |
| 3,553,655 | 1/1971 | Anderson et al. | 340/172.5 |
| 3,570,006 | 3/1971 | Hoff et al. | 340/172.5 |
| 3,601,812 | 8/1971 | Weisbecker | 340/172.5 |

*Primary Examiner*—Gareth D. Shaw
*Assistant Examiner*—Melvin B. Chapnick
*Attorney*—Hanifin & Jancin and Herbert F. Somermeyer

[57] ABSTRACT

A programmable machine selects from among a plurality of branches on condition based upon intrinsic characteristics of the instruction stream in the machine. In a preferred form of the invention, an explicitly addressed machine selects from among a plurality of sets of branches on condition based upon the control memory address from which the branch instruction was fetched, such control memory address being an intrinsic characteristic. Such intrinsic characteristics may selectively include control memory addresses of other instruction words fetched from memory. An instruction decoder has plural decoder sections selectable in accordance with such intrinsic characteristics enabling one instruction word to be variably decoded in accordance with instruction stream characteristics.

14 Claims, 2 Drawing Figures

PROGRAM SELECTION BASED UPON INTRINSIC CHARACTERISTICS OF AN INSTRUCTION STREAM

BACKGROUND OF THE INVENTION

The present invention relates to priority circuits within digital computers and more particularly to a branch control and methods for such machines.

All programmed digital machines have means for selecting among a plurality of programs. Such means usually include hardware recognition of interruption signals, unconditional branches which substitute a predetermined instruction word address for initiating a sequence of program instructions, and branching on conditions set up within the machine. These branching on conditions are based upon operational states within the machine which are extrinsic to the stream of instructions and instruction word addresses. Usually, an arithmetic function, an input/output function, a logic function, and the like are used as a basis for branch conditions. A branch on condition is performed upon the results of such functions to select one of a plurality of programs in accordance with that result. The condition on which branching is effected is selected by code permutations in the instruction word. For example, in an instruction word there may be several control fields. One of the control fields is usually an operation code (OP); another, a branch control (BR); and another an address field. The address field may be for an operand or for fetching the next instruction word. In other machines, instruction counters (IC) are used to sequence the program through a series of instruction words. A branch operation causes the numerical contents of the instruction counter to be changed for initiating a new sequence of program instructions. In other machines, the OP code will determine whether or not a branch is to be performed and upon which condition. A branch field may be included in some machines for selecting one of a plurality of branch conditions. In any event, a certain number of code permutations within an instruction word are dedicated to selecting conditions on which branching of the program may be effected.

These branching or jump instructions are necessary for effective utilization of memory and for using a plurality of different program sequences. On the other hand, it is desirable to reduce the cost of these programmable machines to the utmost. In many instances, the size of the memory word, i.e., the length of its register, is determined by the length of the instruction word. For example, if an instruction word has 48 digit positions, then the memory will usually have 48 digit positions. In some instances, with such an extensively long instruction word, the memory word may be 24 digit positions with an instruction being fetched from two sequential memory locations. On the other hand, in the smaller programmable machines, the memory word size will probably more closely relate to the instruction word length. In some instances, special controls are effected such that instruction word length may be varied independent of the memory word length; however, this requires additional decision making and is not economically most opportune in all situations.

Accordingly, it is desirable to have a branch control and a method of branching which minimizes the number of code permutations required in an instruction word, yet allows a programmer to select sets of conditions in an arbitrary manner.

SUMMARY OF THE INVENTION

It is an object of the present invention to provide a more flexible selectivity in interpretation of OP codes and branch control codes while not increasing the length of the instruction word associated with such enhanced selectivity.

A machine embodying the present invention has certain selected fields, such as the branch field and OP field, subject to various interpretations in accordance with intrinsic characteristics of the stream of instructions. In a preferred form of the present invention, such intrinsic characteristic has a predetermined relationship with memory addresses associated with the stream of instruction words. In an exemplary form of the invention, the memory address from which the branch instruction to be executed is fetched is used to select from among a plurality of sets of possible interpretations of code permutations in the instruction word which effect alterations in program execution. Another preferred form of the invention utilizes the downstream, i.e., previously executed functions, of the stream of instructions to select from among a plurality of operational interpretations. In the most preferred form, the downstream portion is as close as possible to the selection of the operational function--preferably, the instruction word address from which the present instruction was fetched.

The invention further contemplates look-ahead machines in which a base address in an implicitly addressed program may be used to select from among a plurality of operational functions which alter the execution of the program of instructions. This contemplation includes upstream intrinsic characteristics of the instruction stream. In an explicitly addressed machine, the actual memory address may be used for identifying the intrinsic characteristics. In an implicitly addressed machine, it is too difficult for a present-day machine to be organized and programmed to use actual addresses. It is anticipated that as programmable machines become faster and more flexible, base addresses and relative addresses can be monitored to practice the present invention on an effective basis.

The foregoing and other objects, features, and advantages of the invention will be apparent from the following more particular description of a preferred embodiment of the invention, as illustrated in the accompanying drawing.

THE DRAWING

DETAILED DESCRIPTION

Figures 1, 2:
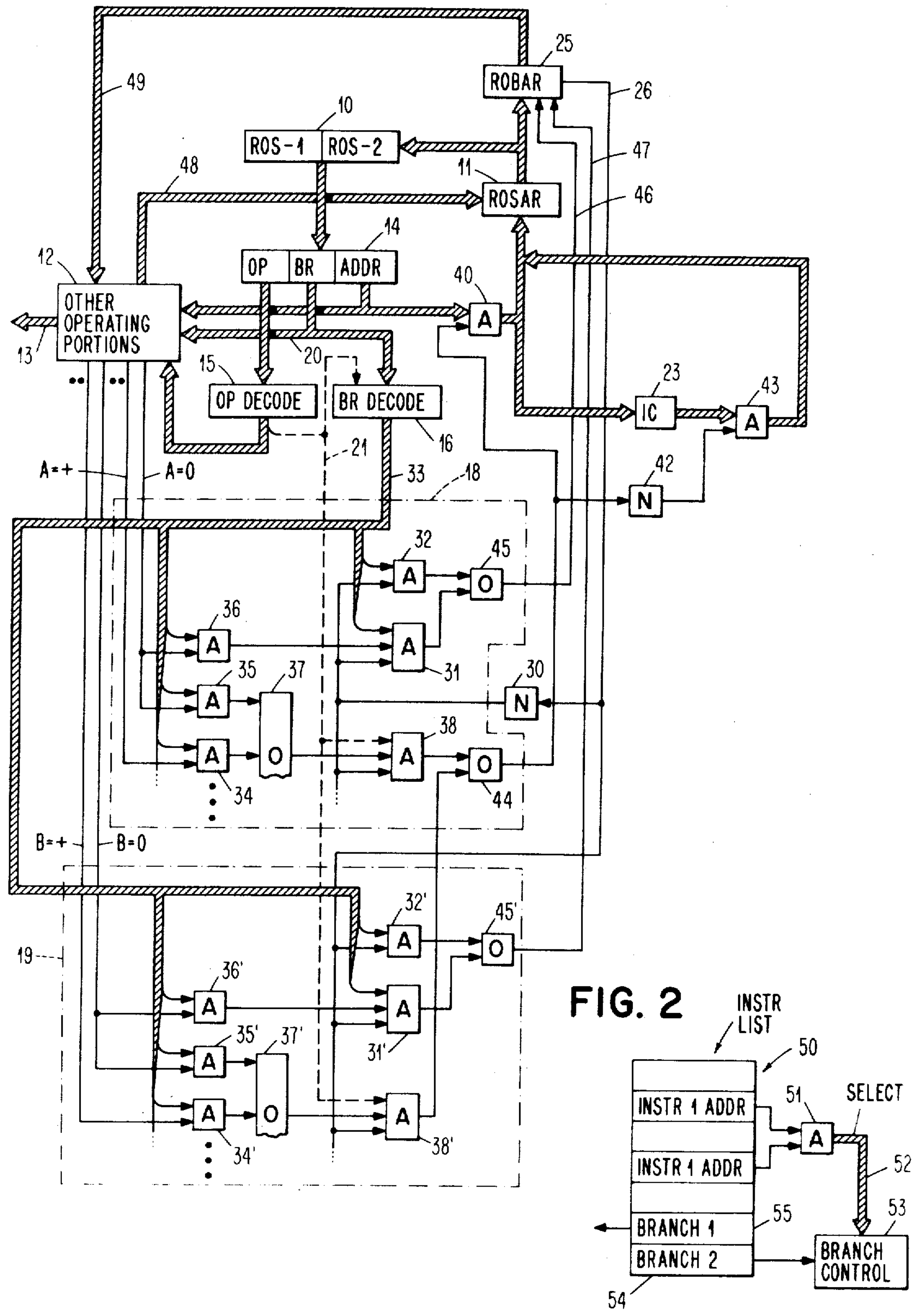
FIG. 1 is a simplified block diagram of a machine used to illustrate a preferred form of the present invention.
FIG. 2 is a simplified instruction stream diagrammatic representation of another embodiment of the present invention.

The programmable machine illustrated in FIG. 1 includes two-zone control memory 10, also identified as ROS-1 and ROS-2. These acronyms indicate the memory is a read only store having zones 1 and 2. An example of a two zone ROS is shown by Ottaway et al. in U.S. Pat. No. 3,391,394 wherein "lo" and "hi" order bins select corresponding ROS zones. The present invention is advantageously applied to small programmable machines, such as the microprogrammable I/O controller disclosed by Irwin in U.S. Pat. No. 3,654,617. The present invention is applicable, particularly to FIG. 3 of the Irwin patent, wherein Irwin's ROS 65 is multizone as in Ottaway et al. and ROSAR 11 of the present description is in ROS 65. Instruction words lodged in control memory 10 are addressed via address register ROSAR 11 as sequenced by other operating portions 12, which include a clock supplying clock signals over lines or cable 13. Since the timing of programmable machines is well known, the clocking and gating for such sequencing is not described. The instruction word accessed from control memory 10 is lodged temporarily in instruction word register (IR) 14. As shown in register 14, the instruction word has an operation code (OP) which supplies signals to an OP decoder 15. OP decoder 15 responds to the OP signals to send control signals to other operating portions 12. In accordance with OP code, other operating portions 12 may perform arithmetic operations, logic operations, I/O operations, diagnostic operations, and the like in accordance with known computer principles and as shown in Irwin, supra. The BR field in IR 14 is the branch field which is supplied to BR decoder 16, which in turn supplies decoded signals to a pair of branch control circuits 18 and 19. In accordance with the illustrated embodiment, the OP code provides functional control of other operating portions 12 while the BR field, through decoder 16, independently controls the branch circuits 18 and 19.

In some machines, the BR field is used for other purposes in addition to branching. For such purposes, cable 20 carries the BR field signals to other portions 12. In that instance, OP decoder 15 has line 21 for supplying a branch OP code to decoder 16 and to selected portions of branch control circuits 18 and 19 for actuating same when OP indicates branch. The rest of the description assumes that branch decoder 16 operates independent of OP decoder 15.

The third field in IR 14 is address field ADDR which identifies a register having and operand in an operating store residing within other portions 12. Alternatively, field ADDR is used in branch operations for presetting bit positions in the ROSAR 11 to establish a predetermined sequence of program instructions accessible from corresponding memory locations in memory 10. The instruction word also may have an additional address field which is directly gated into ROSAR 11 for fetching the next instruction word in a given program sequence. In this case, that field has been replaced by an instruction counter (IC) 23 which increments once each machine cycle; that is, each time control memory 10 is accessed and an instruction word is delivered to register 14, IC 23 is incremented. At the end of each machine cycle, i.e., after the functions have been performed, the contents of IC 23 are gated to ROSAR 11 for fetching the next instruction word. It is to be understood that IC 23 may be readily replaced by an address field in the instruction word. It is also to be understood that instruction words may have various combinations and fields in addition to those shown. Such fields may perform similar or additional functions, and under different names.

The machine cycle of the illustrated machine has two portions. A first portion is the accessing of an instruction word from memory 10 and decoding same in decoders 15 and 16. At the time the signals in ROSAR 11 are supplied to control memory 10 for fetching the instruction word, address backup register ROBAR 25 receives the signal image from ROSAR 11 that was sent to control memory 10. ROBAR 25 then contains the immediately preceding instruction word address. ROBAR 25 is used for diagnostic purposes and also is used in connection with practicing the present invention for selecting which set of branch conditions are to be used in the second portion of the machine cycle.

In the second portion of the machine cycle, other operating portions 12 perform the operations denoted by OP field while the branch control circuits 18 and 19 respond to the BR decode 16 output signal to determine whether or not a branch operation is to be performed. Simultaneously, IC 23 is incremented in preparation for transferring the next instruction word address to ROSAR 11. Clock signals on line 13 actuate all of the circuits in the machine in a known manner for designating which portion of the machine cycle is currently being performed.

Branch controls 18 and 19 respectively respond to different sets of conditions for effecting a branch operation. Branch control 18 responds to at least conditions A=0 and A=+; while branch control 19 responds to at least conditions B=0 and B=+. Conditions A and B are received from other operating portions 12 or may be externally supplied. Selected digit positions of ROBAR 25 actuate either control 18 or 19 during the second portion of each machine cycle. For example, the most significant digit position of ROBAR 25 indicates whether the present instruction was fetched from ROS-1 or ROS-2. If the most significant digit position is a 0, then ROS-1 is indicated as a source, while a binary 1 indicates ROS-2. A plurality of digit positions may be used from ROBAR 25 and, as such, are combined to perform a single instruction word source indicating signal on line 26. Line 26 is directly connected to branch control 19 AND circuits 31', 32', and 38' which perform output gating functions for the decoded and detected branch conditions. In a similar manner, the line 26 signal is inverted by NOT circuit 30 and supplied to branch control 18 for selectively activating AND circuits 31, 32, and 38.

Branch decode 16 supplies its branch condition selecting signals over cable 33 to both controls 18 and 19. Both of these controls are shown as being constructed identically, no limitation thereto being intended. Accordingly, control 18 is described; the same numerals, primed, representing the corresponding parts of control 19.

The condition selecting signals from cable 33 are supplied to a set of AND circuits 34, 35, and 36. There may be a large number of such AND circuits as indicated by the ellipses. At each AND circuit, a branch condition is supplied from other operating portions 12. For example, A=0 condition is supplied to AND circuits 35 and 36, while A=+ is supplied to AND circuit 34. AND circuits 34 and 35 are jointly responsive to the BR decode selecting signals and to the "A" condition to supply a branch activating signal through OR circuit 37 to output AND circuit 38. AND circuit 38 is jointly responsive to the conditions met signal from OR circuit 37 and to the ROBAR 25 instruction word source indicating signal on line 26 to activate branch gate or AND circuits 40. AND circuit 38 supplies its activating signal through OR circuit 44 where it is combined with the AND circuit 38' output signal. AND circuits 40 pass the address signals from field ADDR in IR 14 to ROSAR 11 and to IC 23. These signals are supplied to ROSAR 11 toward the end of the second portion of the machine cycle such that ROSAR 11 can supply the instruction word selecting signals to control memory 10 at the beginning of the first portion of the next succeeding machine cycle and before IC 23 is incremented. The latter enables IC 23 to generate the instruction word address following the address supplied to memory 10.

Because of NOT circuit 30, only one signal will be supplied through OR circuit 44 to activate AND circuits 40. The output signal of OR circuit 44 is also supplied through NOT circuit 42 to block AND circuits 43 during a branching operation. This action inhibits transfer of signals from IC 23 to ROSAR 11. If none of the branch conditions matched the BR decode 16 selecting signals, AND circuits 40 are disabled for blocking the transfer of signals from IR register 14 while enabling AND circuits 43 to pass the signal combinations from IC 23 to ROSAR 11. The latter transfer, of course, continues the sequence of program instructions currently being performed.

The above-described form of branching contemplates substitution of the signals from address field of IR 14 for a major portion or all of the signals residing in ROSAR 11. This is an arbitrary selection and is based upon machine design principles. In other forms of branching operations, selected bit positions of ROSAR 11 may be changed to, in effect, branch between program-determined segments within ROS-1 or ROS-2 or between ROS-1 and ROS-2. The same conditions activating AND circuits 34 and 35 for the above-described "broadside" type of branch operation can be used for determining selective alteration of a minimum number of bit positions in ROSAR 11 for interzone branching.

Branch control 18 AND circuit 36 receives a BR decode 16 selecting signal and the A=0 condition. The code permutation supplied from BR decoder 16 to AND circuits 35 and 36 are different such that the A=0 branch condition may be used in different manners. AND circuit 36 supplies its branch indicating signal to AND circuit 31 while AND circuit 36' supplies its branch indicating signal to AND circuit 31'. Depending upon the condition of the most significant digit in ROBAR 25, either AND circuit 31 or 31' will be enabled if the conditions are met. These AND circuits supply the branch selecting signal through OR circuit 45 or 45', respectively, over lines 46 and 47 to ROSAR 11. The signal on line 46, for example, may alter the least significant digit position of ROSAR 11 while the signal on line 47 may alter the next to the least significant digit position. Of course, other digit positions may be similarly altered.

BR field in IR 14 may be used for an unconditional branch operation. For example, if BR field is all 0's, then an unconditional branch may be indicated, whereas if it is all 1's, no branch is indicated. Assuming for a moment that BR is all 0's, then the decoded signal is supplied from cable 33 to AND circuit 32 and 32'; which branch is made depends entirely upon the zone of control memory 10 from which the instruction was fetched; i.e., if it was fetched from ROS-1, AND circuit 32 is activated to supply its signal through OR circuit 45 whereas if ROS-2 was the source, AND circuit 32' supplies the branching indicating signal through OR circuit 45'. It may be noted that the outputs of OR circuits 45 and 45' control a different digit position of ROSAR 11.

Additionally, cable 48 carries signals from other operating portions 12 to ROSAR 11. Further branching operations, based upon known initialization (including trapping) procedures, may be used for setting ROSAR 11 to preselected memory locations for initiating routines based upon conditions in the operating portions 12. In a similar manner, the ADDR portion of IR 14 is supplied over cable 20 to other operating portions 12 for use therein in one of several manners. Also, the output signals of ROBAR 25 are supplied over cable 49 to other operating portions 12. In this latter instance, the signal conditions of ROBAR 25 may be useful in diagnostic procedures such as in connection with manual operation of the machine via a maintenance panel.

In the above description, it is seen that examination of the intrinsic characteristic of the stream of instruction word addresses, specifically, the zone of memory from which the present instruction word was fetched, is useful in expanding the branch on condition capability of a machine without altering the length of the instruction word contained in IR 14. This invention is particularly useful in a machine having a read only store, such as the one just described. Routines relating to a certain phase of machine operations can be stored in ROS-1 and in which branching is based upon a first set of branch conditions. A second set of programs can be lodged in ROS-2 which relate to other functions performable by the programmable machine and which can more advantageously use a second set of branch conditions such as the B set used with branch control 19. When a control memory 10 has more than two zones, additional branch controls may be added for providing yet a greater flexibility in branching operation. When there are eight zones of memory, four of the zones may use the same set of branch conditions, while each of the second four may use their own independent sets of branch conditions, etc.

The present invention may also be applied to look-ahead machines; that is, a plurality of instruction words to be executed are fetched from a memory before the machine can execute such instructions. In such a system, the instruction words usually are readily available to the machine for rapid transfer into decoding circuits such that predetermined instruction indicated functions may be performed. Branch controls may have input lines from registers containing instructions fetched as well as the addresses from which such look-ahead instructions were fetched. A given set of branch conditions may be utilized on such look-ahead intrinsic characteristics of the instruction stream.

The above description concerned explicitly addressed machines wherein the memory location from which the instruction word is fetched is uniquely known. In implicitly addressed machines, the programmer may not know which memory locations contain his program. Even with relative addressing, the actual relative address may be unknown to the programmer. Usually, a program is set up for use by a compiler to convert to a sequence of program instructions. The programmer knows only the storage (register) which contains his base address. The address of this register is contained in each IR. Therefore, it can be used to modify the BR decoders, but not the contents of the base address which are set at load time by OS-360, for example in a machine writable store (not shown) which would replace ROS 10. OS-360 are sets of computer control programs employed by International Business Machines Corporation to operate their 360 line of computers. These programs are well known. This base address register may change from program segment to program segment. In spite of this, base address registers are a relatively easy intrinsic characteristic to utilize in practicing the present invention in an implicitly addressed machine. A branch interpretation register may receive the base address register number or address in accordance with program determination. A plurality of branch controls may be responsive to code permutations indicating such base addresses for given program segments, for selecting a set of branch conditions varying from one base address indication to another.

FIG. 2 is a simplified showing of a stream of instruction words 50. There are two instruction 1 addresses in that stream of instruction words. Registers may contain these various instruction words along with their addresses. Other registers may have output connections to an AND circuit or other logic decoding network 51. Network 51 (shown in simple form as an AND circuit) is responsive to certain code permutations in selected ones of the registers in predetermined logically spatial relationships to supply an output signal over cable 52 to a branch control 53. Branch control 53 may have a memory therein for remembering the permutations detected by network 51. Then, based upon execution of a selected branch instruction, such as branch 54, one of a plurality of branch conditions may be selected for effecting the branch. In other branch operations, such as branch instruction 55, the selectivity may not be permitted. A machine designed to effect the functions described in FIG. 2 may be easily designed using the principles described with respect to FIG. 1 as well as known techniques.

While the invention has been particularly shown and described with reference to a preferred embodiment thereof, it will be understood by those skilled in the art that various changes in form and details may be made therein without departing from the spirit and scope of the invention.

What is claimed is:

1. The method of performing a branching operation in a programmable machine having a sequence of operations determined by a stream of instruction words exhibiting intrinsic characteristics and acquired from predetermined memory locations, including the following steps in combination:

examining said stream for said intrinsic characteristics, selecting a set of branch conditions in accordance with said examined intrinsic characteristics, and executing a branch on condition instruction based on one of said instruction words related to said examined intrinsic characteristics in accordance with said branch on condition instruction and upon said selected set.

2. The method of performing the operation set forth in claim 1 wherein said intrinsic characteristics include a memory address of an instruction word fetched from memory.

3. The method of performing the operation set forth in claim 2 wherein said address is the address of one instruction word which was last fetched from a memory location.

4. The method of performing the operation of claim 3 wherein said branching operation is effected by selecting one of two complete memory addresses as the next instruction word address to be fetched from memory with said one address being selected cojointly in accordance with the memory address of said one instruction word fetched as well as a set of conditions indicated by another portion of said machine.

5. The method of performing the operation of claim 4 wherein the programmable machine fetches an instruction word on an explicit basis.

6. A programmable machine having a program selection control for containing a present instruction word comprising:

first means for examining intrinsic characteristics of a stream of instruction word addresses, second means examining the present instruction word, and selection means jointly responsive to said first and second means to select a memory register in accordance with said examinations.

7. The apparatus set forth in claim 6 wherein said second means comprises a decoder responsive to a preselected field in an instruction word independent of the operation being performed and operative to supply branch condition selection signals, said selection means being responsive to said selection signals to select one of a plurality of branch conditions among plural sets of such branch conditions, and being responsive to said first means' examination to select the set of said branch conditions.

8. The apparatus set forth in claim 7 further including a current address register and a backup address register, said backup address register receiving signals from the current address register substantially simultaneously with the supplying of such signals to a memory for selecting a memory register, and portions of said backup address register being connected to said first means and said first means being responsive to code permutations in said portions for selecting a set of branch conditions.

9. The apparatus set forth in claim 6 wherein said first means includes examination of a plurality of items in said stream of instruction word addresses for determining a plurality of intrinsic characteristics, and said selection means being responsive to said determined characteristics for selecting one of a plurality of sets of branch conditions for selecting a memory address for the next instruction word to be executed in said programmable machine.

10. The apparatus set forth in claim 6 wherein said first means includes memory means for memorizing characteristics of a stream of instruction word addresses that have been previously used in connection with fetching at least one instruction word from a memory for establishing upstream intrinsic characteristics for said stream of instruction word addresses, and said selection means being responsive to said upstream intrinsic characteristics for selecting a set of branch conditions.

11. A programmable machine having control means with improved branching operations including the combination of:

an instruction word register for containing code permutations of a current instruction word, a control memory connected to said instruction word register for repeatedly supplying instruction words thereto, first and second address registers for receiving and temporarily memorizing instruction word addresses in a sequence of two instruction words, one of said registers supplying a selection signal to the control memory for selecting a memory location for fetching an instruction word to be supplied to said instruction word register, and first and second branch controls jointly responsive to said second register and to at least a portion of said instruction word in said instruction word register to select which address is to be used among a plurality of addresses for fetching the next instruction word.

12. The apparatus set forth in claim 11 wherein said portion is a branch field in said instruction word independent of other portions thereof and including:

branch control means responsive to said selection signal to activate one of said branch controls to select said address for fetching the next instruction word.

13. An instruction word decoder for a programmable machine, including in combination:

means fetching instruction words, a decoder having plural sections, means responsive to said fetching means to activate one of said decoder sections, and said one decoder section being responsive to one of said instruction words to initiate a predetermined action in the machine.

14. The decoder set forth in claim 13 wherein said instruction words are stored in preselected control memory zones in a control memory, the improvement further including the combination of:

said fetching means indicating which zone of said control memory the present instruction word was fetched, said responsive means being responsive to said indication to activate said one decoder section, and said one decoder section being responsive to said present instruction word to initiate said pre-determined action while other of said decoder sections capable of initiating other actions in response to the same instruction word when selected.

* * * * *